C. JOHNSON & C. FRANK.

VARIABLE SPEED POWER TRANSMITTING MECHANISM.

APPLICATION FILED MAY 31, 1911.

1,011,623. Patented Dec. 12, 1911.

WITNESSES

E. J. Stauby

H. E. Chase

INVENTORS

Charles Johnson and

Charles Frank

BY

Howard P. Denison

ATTORNEY.

COLUMBIA PLANOGRAPH CO., WASHINGTON, D. C.

UNITED STATES PATENT OFFICE.

CHARLES JOHNSON, OF AUBURN, AND CHARLES FRANK, OF SENECA FALLS, NEW YORK.

VARIABLE-SPEED POWER-TRANSMITTING MECHANISM.

1,011,623. Specification of Letters Patent. Patented Dec. 12, 1911.

Application filed May 31, 1911. Serial No. 630,297.

*To all whom it may concern:*

Be it known that we, Charles Johnson and Charles Frank, of Auburn and Seneca Falls, respectively, in the counties of Cayuga and Seneca, respectively, in the State of New York, have invented new and useful Improvements in Variable-Speed Power-Transmitting Mechanism, of which the following, taken in connection with the accompanying drawings, is a full, clear, and exact description.

This invention relates to certain improvements in variable speed power transmitting mechanism of the class set forth in our Patent #872,131, November 26, 1907, and refers more particularly to the apron-driving mechanism of manure spreaders and similar machines in which an endless bed is actuated through the medium of a worm and gear.

In machines of this character in which the endless bed or apron is moved at a relatively slow rate of speed to feed the fertilizer to the beater or beaters, the entire load of fertilizer is carried by the apron and in many instances is compact, plastic and therefore heavy and adheres more or less to the sides of the box, thereby requiring considerable power to operate the traveling bed or apron.

The worm and gear is found to be the most practicable and efficient means for transmitting motion from the driving gear to the apron and owing to the fact that the worm is necessarily tangential to the worm gear, it sometimes happens that the worm shaft or its supporting bearings will become bent or broken under the strains to which they are subjected, and the main object of our present invention is to obviate this liability by providing an intermediate rigid connection between the shafts of the worm and gear for the purpose not only of holding the worm in operative engagement with the gear but also of preventing the bending or breaking of the worm shaft and its bearings.

Other objects and uses will be brought out in the following description.

Figure 1:
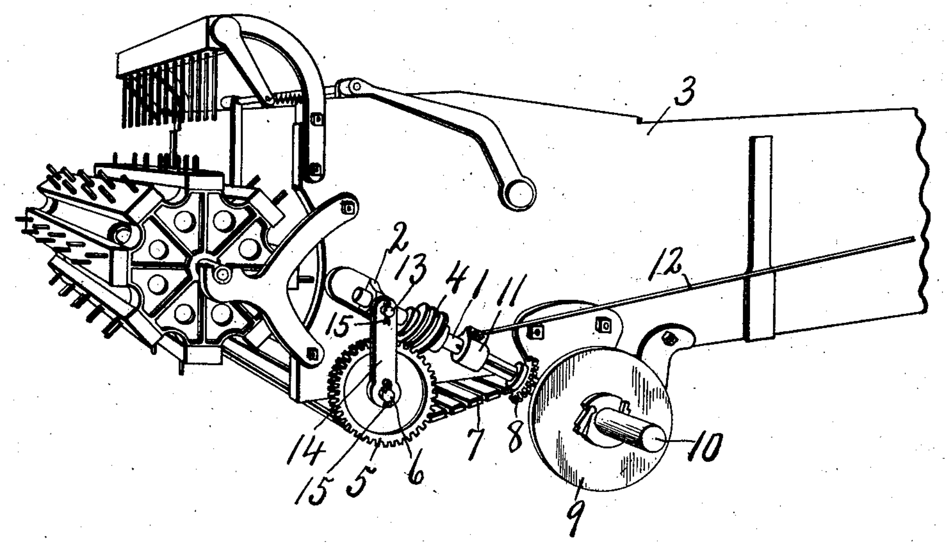
Figure 2:
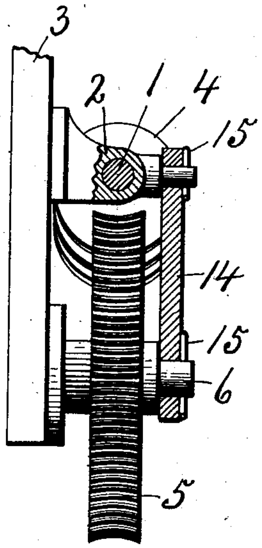

In the drawings—Figure 1 is a perspective view of the rear end of a manure spreader showing our improved apron driving mechanism. Fig. 2 is an enlarged rear elevation partly in section of the apron driving mechanism shown in Fig. 1.

In carrying out the objects stated, a worm shaft —1— is mounted in an upwardly and rearwardly inclined position in suitable bearings —2— on one side of the main body or box —3— of the spreader and is provided with a worm —4— meshing with a gear —5— which is secured to the adjacent end of a transversely extending shaft or drum —6— for operating a traveling bed or apron —7— forming the bottom of the box —3—.

A pinion —8— is suitably splined upon the worm shaft —1— to slide endwise into and out of engagement with a relatively large gear —9— having a series of concentric rows of teeth not shown but of substantially the same construction as that shown in our patent referred to for driving the worm shaft and endless bed or apron at different speeds, said gear —9— being mounted upon the rear axle as —10— of the machine.

The pinion —8— may be moved endwise by any suitable operating means and for this purpose is connected to a sliding collar —11— on the worm shaft —1— and adapted to be operated lengthwise of said shaft by means of a rod or link —12— and suitable hand lever not shown.

The front end of the worm shaft —1— may be yoked to the main driving shaft or axle —10— by any suitable bearing not necessary to herein illustrate or describe, while the bearing —2— is adapted to receive the rear end of the same shaft and is secured by suitable fastening means to the adjacent side of the box —3— some distance to the rear of the vertical plane of the axis of the apron shaft or drum —6—. This bearing is provided with a laterally projecting stud —13— directly over the drum shaft —6— and connected to said drum shaft by a tie bar —14— which forms the main feature of our present invention. The opposite ends of the bar are provided with apertures for receiving the stud —13— and shaft —6— and is held in operative position by suitable pins or cotter keys —15— so that it may be easily and quickly placed in operative position or removed when necessary. The bracket —2— therefore performs a double function of holding the rear end of the worm shaft —1— and upper end of the tie bar or strap —14— and permits the shafts —1— and —6— to be connected in a substantially vertical line in close proximity to the rear end of the worm —4— where the strain is most severe so that the liability of bending or breaking of any of the associated parts of the driving mechanism is materially reduced and at the same time the worm is more effectively held in operative engagement with the worm gear. Another important advantage in the use of this tie bar is that it holds the worm shaft more steadily against vibratory or springing movement and thus permits the pinion —8— to be moved longitudinally thereof with greater freedom in changing speeds.

What we claim is:

1. A driving gear mechanism comprising a driving element, a worm shaft extending therefrom at an inclination, a pinion slidably mounted upon said worm shaft and adapted to be shifted into operative engagement with said driving element, a driven element, a gear secured to said driven element and meshing with the worm shaft, a supporting bracket for one end of the worm shaft and formed with a laterally projecting stud, and a vertically disposed rigid tie bar connecting said stud to said driven element.

2. A driving gear mechanism comprising a rotatable element, a worm gear carried thereby, a worm shaft having a worm meshing with said gear, a bearing for the worm shaft having a laterally projecting stud, a rigid connection between the stud and said element, and means for driving the worm shaft.

3. A driving gear mechanism comprising a rotatable element, a worm gear carried thereby, a worm shaft having a worm meshing with said gear, a bearing for the worm shaft having a laterally projecting stud, a rigid connection between the stud and said element, and a speed change driving mechanism for the worm shaft.

4. A driving gear mechanism comprising a driven element, a worm gear carried thereby, a worm shaft extending at an inclination and having one end arranged over said driven element, a worm on said shaft meshing with said gear, a bearing for the said end of the worm shaft, a rigid connection between said bearing and said element, and a speed change driving means for said worm shaft.

In witness whereof we have hereunto set our hands this 24 day of May, 1911.

CHARLES JOHNSON.
CHARLES FRANK.

Witnesses:
L. A. Pierce,
D. J. Strickland.

Copies of this patent may be obtained for five cents each, by addressing the "Commissioner of Patents, Washington, D. C."